S. Merrick,
Wrench.
Nº 5,707.     Patented Aug. 15, 1848.
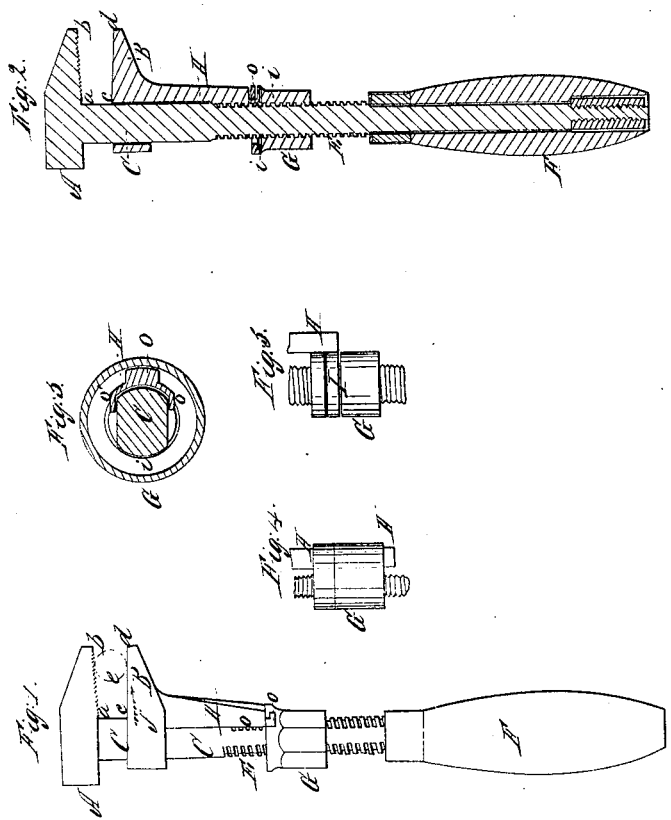

UNITED STATES PATENT OFFICE.

SOLYMAN MERRICK, OF SPRINGFIELD, MASSACHUSETTS.

SCREW-WRENCH.

Specification of Letters Patent No. 5,707, dated August 15, 1848.

*To all whom it may concern:*

Be it known that I, SOLYMAN MERRICK, of Springfield, in the county of Hampden and State of Massachusetts, have invented a new and useful Improvement in Screw-Wrenches; and I do hereby declare that the same is fully represented and described in the following specification and accompanying drawings, letters, figures, and references thereof.

Figure 3 is a horizontal or transverse section of the projecting arm H and the shank C, to be hereinafter mentioned.

Of the said drawings, Fig. 1 denotes a side elevation of my improved screw wrench. Fig. 2 is a central and vertical section of the same.

In said drawings A exhibits the stationary hammer jaw; B, the movable jaw; C, the shank on which the jaw B slides; E, the screw of shank; F, the handle; G, the movable screw nut, connected to the movable jaw B by an extension or projecting arm H.

By revolving the nut G, on the screw E, the movable jaw B, is made to advance toward or depart from the fixed jaw A, in accordance with the direction in which said nut is revolved. The contiguous faces $a$, $b$, $c$, $d$, of the two jaws are not made parallel to each other as in other screw wrenches, but when the two jaws are brought together so as to touch, make an angle with each other. One of the said faces is made rough or with indents or teeth, while the other is left smooth or without any such roughness, or teeth, as seen in the drawings. The object of this mode of making the faces of the jaws, is to enable them to act on cylindrical nuts or surfaces, the ordinary kinds of screw wrenches being only adapted to square or prismatic nuts. If we place a cylindrical nut between the two jaws as represented by the dotted circle $e$, in Fig. 1, and turn the wrench in the direction denoted by the arrow $f$, we shall find that the teeth on the face $a$, $b$, in contact with the nut will prevent said face from slipping on the nut, and by so doing will cause the other face $c$, $d$, to slip on the nut in such manner as to draw the nut closer into the jaws or toward the line $a$, $c$, and thus cause the jaws to take a firm hold of it. The faces of the jaws may be made to flare in an opposite direction, and produce a similar effect when the wrench is turned in an opposite direction, that is to say the two faces may be so arranged that they may be nearer to one another at the extremities $b$, $d$, than they are at the extremities $a$, $c$.

The next part of my invention consists in the manner in which I combine the nut G, and projection or arm H, with one another and with the screw E, and shank C. For this purpose I do not extend the arm H, through the nut G, as represented in Fig. 4, nor do I connect it to the nut by a strap or band I, made to rest in a groove made in the nut as seen in Fig. 5; but just above the screw of the nut, I form a cylindrical chamber $i$, $i$, around the screw as seen in Fig. 2, and around in the side of said chamber, I turn or make a groove $n$, for the purpose of receiving a projection $o$, extending from the arm H, as seen in said Fig. 2, the lower part of the said arm being introduced into the chamber $i$, $i$, as seen in said figure. By this method of adapting the nut and arm to one another the former is made to operate with much less friction or bind than it does when said parts are conjoined as represented in Figs. 4 and 5. Besides this there are other advantages in the same. In order to steady the movements of the movable jaw, I affix to the arm H, two side plates or projections $o$, $o'$, as seen in Figs. 1 and 3. They are made to project from the said arm and a short distance over the sides of the shank.

What I claim in the above described improved screw wrench, and for the purpose of rendering it available in turning cylindrical nuts or other articles, is—

The within specified manner of making and arranging the contiguous binding faces $a$, $b$, $c$, $d$, of the jaws, the same consisting 1st, in making them not parallel to each other, but so as to form an angle when the jaws are brought in conjunction or close down upon one another; 2nd, in roughening one of the faces or forming it with teeth and making the other smooth as described.

In testimony whereof I have hereto set my signature this twenty-ninth day of March A. D. 1848.

SOLYMAN MERRICK.

Witnesses:
 HENRY FOX,
 HOMER FOOT.